Nov. 27, 1934.    P. L. MILLER    1,982,393
ANIMAL TRAP
Filed Sept. 25, 1933
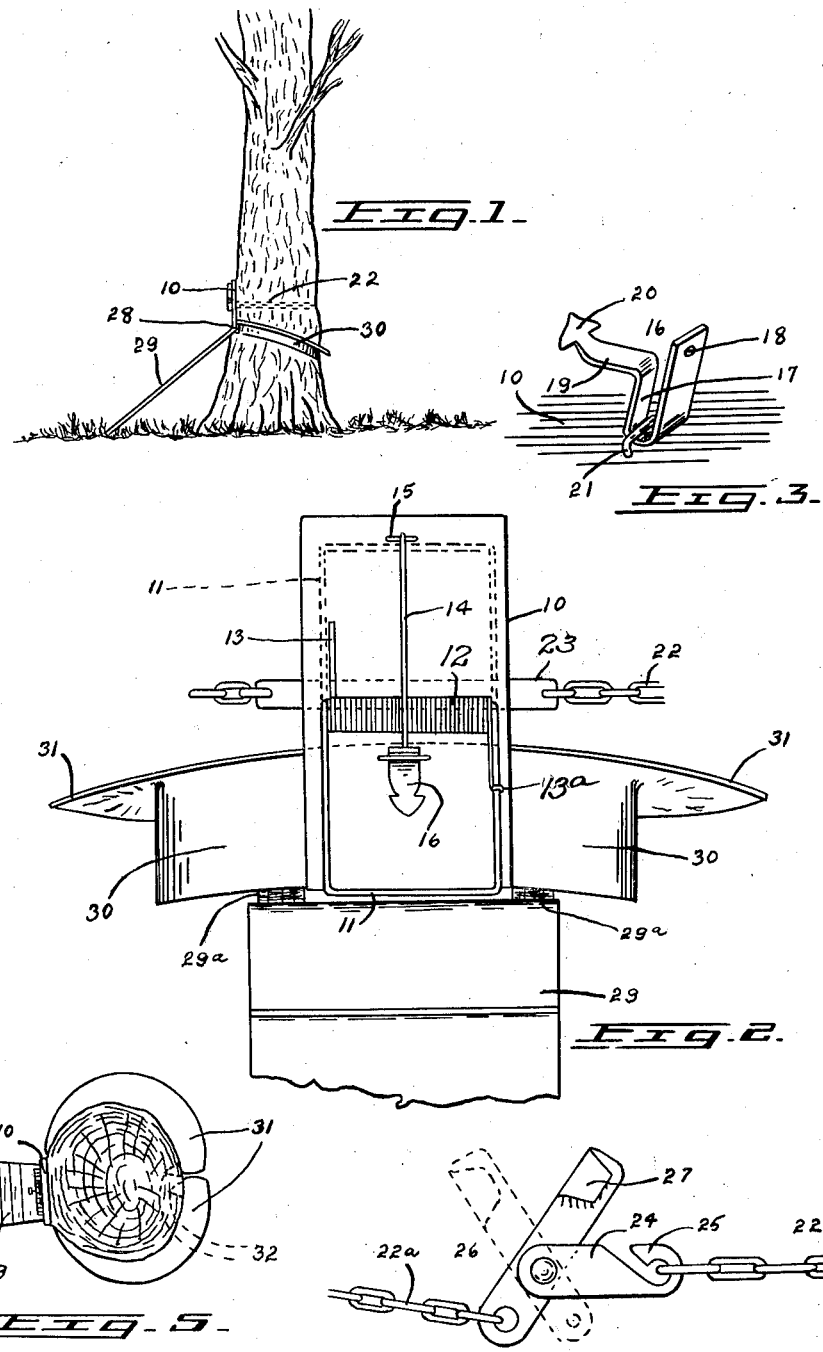
INVENTOR
Percy L. Miller,
By Ralph Burch
Attorney Patented Nov. 27, 1934

1,982,393

UNITED STATES PATENT OFFICE 1,982,393

ANIMAL TRAP

Percy Lorne Miller, Wakeham, Quebec, Canada

Application September 25, 1933, Serial No. 690,918

3 Claims. (Cl. 43—89)

This invention relates to improvements in an animal trap. Its primary object is to provide a trap adapted to be used vertically on a tree trunk.

A further object of the invention is to provide such a trap having means detachably securing the same to a tree.

A still further object is to provide means holding the bait while the said trap is in a vertical position and means guiding an animal to said bait.

With these and other objects in view that may appear while the description proceeds the invention consists in the novel construction and arrangement of parts as hereinafter more specifically set forth, claimed, and shown in the accompanying drawing in which:—

Fig. 1 is a general view showing the trap in position on a tree.

Fig. 2 is a front elevation of my improved animal trap.

Fig. 3 is a detailed perspective view of the bait holding means.

Fig. 4 is a detailed view of the chain tightening means.

Fig. 5 is a plan view showing position of wing members around the tree trunk.

Referring more in detail to the drawing in which similar reference characters designate corresponding parts throughout the several views it will be seen the invention comprises a base 10 having a rectangular frame wire 11 pivotally mounted centrally thereon. A helical spring 12 is likewise secured to the base 10 by one end wire 13 the other end 13a being secured on one side of the wire 11 in a manner to cause the same to normally close against the lower end of the base 10. The frame wire 11 when set, is opened against the tension of the spring 12 and held open by a wire member 14 which is pivotally secured to the base at 15, and extends to engage the bait holding device. This constitutes a trigger 16 and comprises a U shaped member 17 with an orifice 18 in one end thereof. The other end 19 is bent substantially at right angles and a spear head bait hook 20 formed at the extremity thereof, said hook being slightly bent at an angle from portion 19 to aid in holding the bait on the hook. The orifice 18 is engaged by the wire member 14 in a manner to hold the trigger in an upright position. The said trigger 16 is pivotally mounted on the base 10 and secured by a keeper 21. The tension of the spring 12 is exerted on the wire 14 and in turn on the trigger 16 to hold the same until an animal tugs at the bait on the hook which releases the wire and frame thus catching and holding the animal securely to the base block.

The trap is held vertically on a tree trunk, stump or other similar place by a chain 22, said chain being secured to a strap iron member 23 on the base 10. A chain fastener 24 is provided to secure and tighten the chain around the tree. The fastener comprises a chain hook member 25 pivoted to a lever 26, to which the other end 22a of the chain 22 is fastened at the short end thereof and on the long end of the said lever 26 a chain catch element 27 is formed and is designed to be secured under the chain 22a after the lever has been reversed to tighten the chain.

The tree may be notched as shown at 28 to provide a convenient place to secure the trap and a runway 29 is hingedly mounted, as at 29a, to extend downwardly from the trap towards the ground and serves as a guide in leading the animals to the trap.

Extending around the trunk of the tree are wing members 30 constructed from a light angle iron, said members are secured to the base of the trap and extend outwards and slightly downwards therefrom, the horizontal portion 31 of the said angle iron forming a barrier to prevent an animal climbing the tree, and are intended to guide said animal around to that part of the tree on which the trap is positioned. Spikes 32 may be formed on the ends of the said wing members to be driven into the tree and secure the same in position.

It is believed the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating elements may be resorted to within the scope of what is claimed without departing from the spirit of the invention.

I claim:

1. In an animal trap for mounting on a tree, a spring trap, means securing said trap to the tree in a vertical position, an inclined runway extending downwardly from said trap for leading animals from the ground to the trap, and a guard member extending around the tree from opposite sides of said trap for directing the course of animals climbing the tree towards said trap and runway.

2. In an animal trap for mounting on a tree, a spring trap, means securing said trap to the tree in a vertical position, an inclined runway extending downwardly from said trap for leading animals from the ground to the trap and a guard member extending around the tree from opposite sides of said trap, said guard member having a horizontal portion which acts as a barrier to animals climbing the tree and directs the course of the animals towards the trap and runway.

3. In an animal trap for mounting on a tree, a spring trap, means securing said trap to the tree in a vertical position, an inclined runway extending downwardly from said trap for leading animals from the ground to the trap and a guard comprising wing members extending from the sides of said trap around the tree in a downwardly inclined direction, said guard having a laterally extending flange which acts as a barrier to animals climbing the tree and diverts the course of the animals towards the trap and runway.

PERCY LORNE MILLER.